United States Patent [19]

Kito et al.

[11] Patent Number: 5,025,901
[45] Date of Patent: Jun. 25, 1991

[54] SHIFT LEVER APPARATUS FOR AUTOMATIC TRANSMISSION

[75] Inventors: Shozo Kito; Shoichi Harada; Hajime Imai, all of Aichi, Japan

[73] Assignee: Kabushiki Kaisha Tokai-Rika-Denki-Seisakusho, Aichi, Japan

[21] Appl. No.: 405,435

[22] Filed: Sep. 11, 1989

[30] Foreign Application Priority Data

Sep. 12, 1988 [JP] Japan .................... 63-119431[U]

[51] Int. Cl.⁵ .................... B60K 20/00; G05G 11/00
[52] U.S. Cl. .................... 192/4 A; 74/483 R; 74/483 PB
[58] Field of Search .................... 74/483 R, 483 PB; 192/4 A

[56] References Cited

U.S. PATENT DOCUMENTS

| | | | |
|---|---|---|---|
| 3,942,614 | 6/1974 | Thompson | 192/4 A |
| 4,187,935 | 2/1980 | O'Hern | 192/4 A |
| 4,884,668 | 12/1989 | Kobayashi et al. | 192/4 A |

Primary Examiner—Allan D. Herrmann
Assistant Examiner—David W. Laub
Attorney, Agent, or Firm—Oliff & Berridge

[57] ABSTRACT

A shift lever for shifting an automatic transmission is axially supported by a base plate which is provided with a locking device to enable shift operation of the shift lever when the driver depresses the brake pedal. A cover is mounted to the base plate and is provided with a lock cancellation push button to forcedly cancel the locking apparatus at times when the vehicle is being repaired or the like. The button on the cover and the locking device are connected by a flexible wire and so operative force of the pushbutton can be definitely transmitted to the locking device to cancel the lock even if the positions for assembling the cover to the base plate are not always the same.

19 Claims, 9 Drawing Sheets

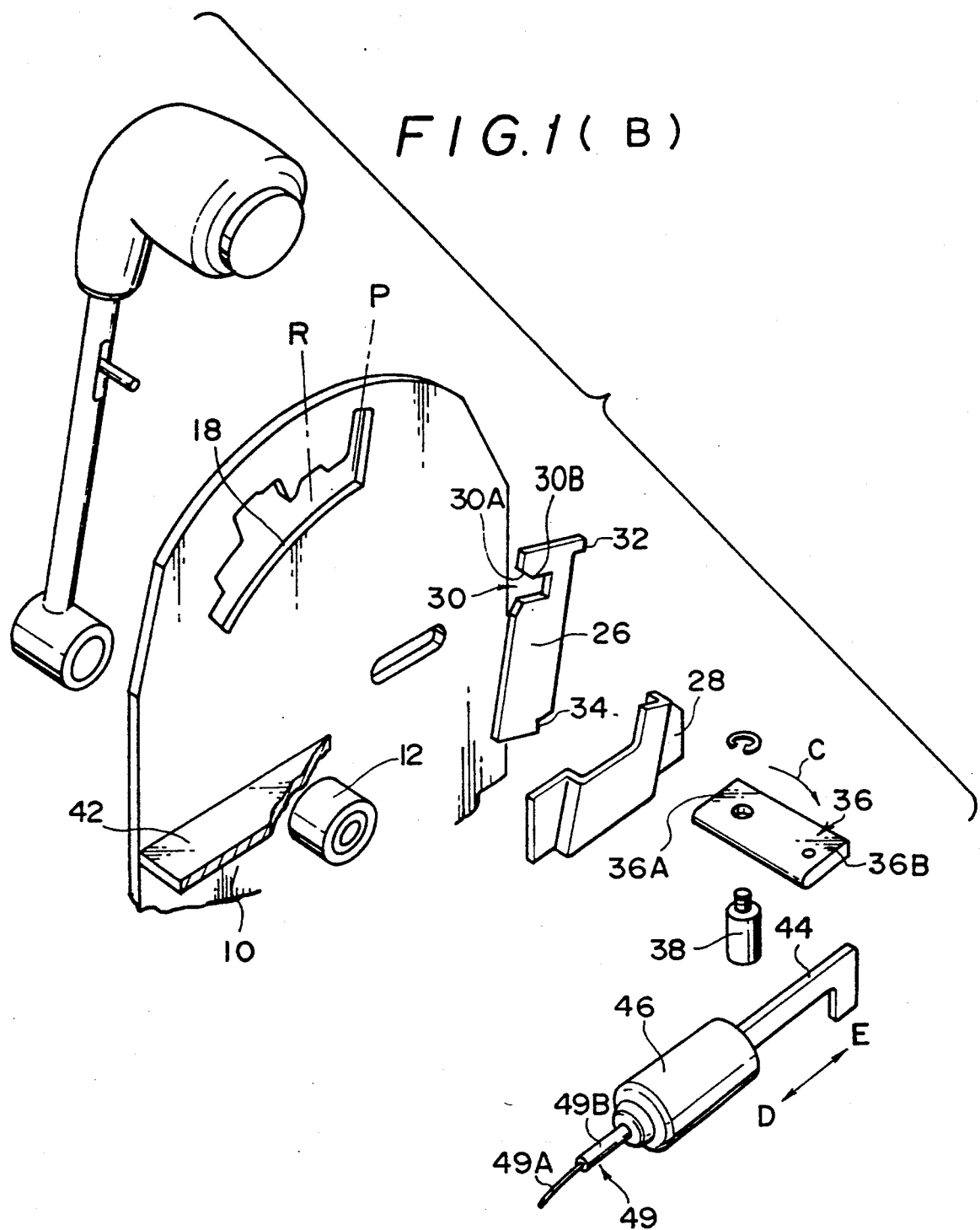

SHIFT LEVER APPARATUS FOR AUTOMATIC TRANSMISSION

BACKGROUND OF THE INVENTION

1. Field of the Invention

This invention relates to a shift lever apparatus of an automatic transmission mounted on an automobile, used for manually remote operation from driver's cabin, and more particularly to a shift lever apparatus for an automatic transmission provided with a shift lock for locking the shift lever and a manually operated shift lock cancellation means for manual cancellation of the lock of the shift lever.

2. Description of the Related Art

In a known type of a shift lever apparatus for an automatic transmission, as described in Japanese Patent Application Laid-Open No. 20343-1987, there is provided a shift lock which locks a shift lever at a certain shift position and cancels the locking of the shift lever by electrically operating an actuator when a brake pedal is depressed.

Some of the shift lever apparatuses having such a shift lock are also provided with a manually-operated shift lock cancellation mechanism which is capable of cancelling the locking of the shift lever manually even when power can not be supplied to the actuator, for example, at the time of the maintenance work which is conducted under a disconnected condition between a power source and the actuator.

Such a shift lock cancellation means is constituted such that the locking of the shift lever is cancelled by a motive mechanism that is operated by a manual force input from an operating portion.

This motive mechanism is mounted on a base provided with the actuator. The operating portion must be disposed in the position where it can be readily operated if the necessity arises. Therefore, the operating portion is not provided on the base covered with a housing but it is disposed on the housing exposed to the driver's cabin.

The housing and the base are independent parts, respectively, and the housing is positioned and assembled on the base into one unit in the final step of assembling.

That is to say, the operating portion and the motive mechanism are independently mounted to the housing and the base, and their end parts are connected to each other when the housing and the base are assembled into the one unit, so that the operating portion and the motive mechanism are linked to each other.

Accordingly, there are many instances where the end parts of the operating portion and the motive mechanism are not fitted to each other within the range of tolerance deviation because of the various types of deviations that unavoidably occur. There is such a problem that it is necessary to adjust the unfitting connection or it is required to provide a separate mechanism that eliminates the need for the adjustment.

SUMMARY OF THE INVENTION

In view of the above fact, the object of the present invention is to provide a shift lever apparatus for an automatic transmission that requires no position adjustment for the shift lock means and the manually-operated shift lock cancellation means regardless of their positional relationship to each other.

A shift lever apparatus for an automatic transmission according to this invention is provided with a shift lock means and a lock cancellation means that are interconnected by a driving force transmission cable. Therefore, an operative input of a driver is transmitted via the driving force transmission cable to the lock cancellation means. The driving force transmission cable eliminates the influence of the positional relationships between the shift lock means and the lock cancellation means, even though the both are mounted at different places of a vehicle body and can definitely transmit the operative input of the driver.

DESCRIPTION OF THE PREFERRED EMBODIMENTS

Figure 1:
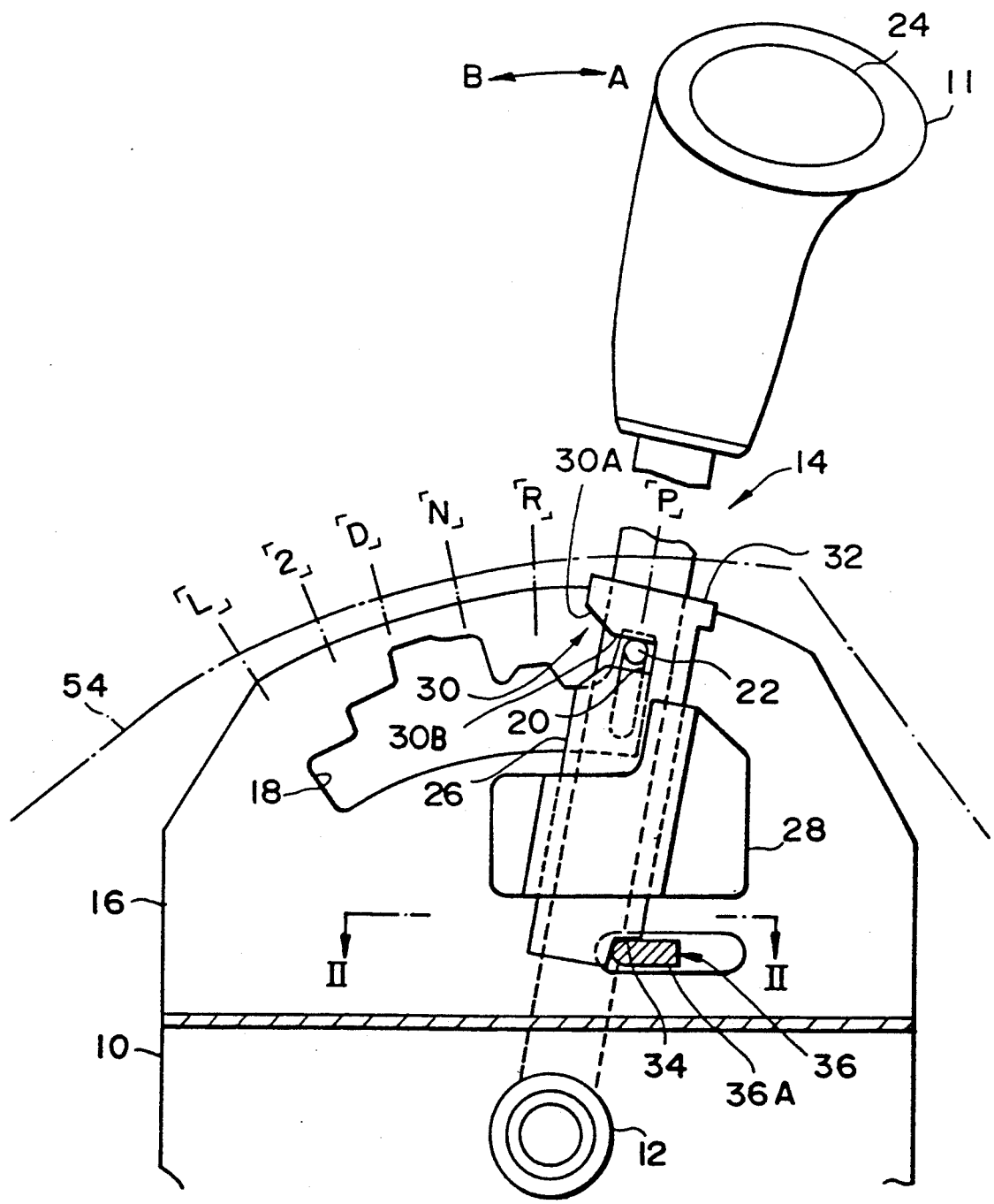
FIG. 1A is a sectional diagram of a shift lever apparatus for an automatic transmission according to a first embodiment of the present invention.
FIG. 1B is an exploded assembly diagram of a shift lever apparatus for an automatic transmission according to the first embodiment of the present invention.

FIG. 1A through FIG. 5 show a first embodiment of a shift lever apparatus for an automatic transmission according to this invention.

As shown in FIGs. 1A and 1B, a base plate 10 constituting a base, rotatably supports a shift lever 14 via a sleeve 12 fixed to a lower end of the base plate 10. The shift lever 14 can be moved in the directions indicated by the arrows A and B by operation of a shift knob 11 mounted at an upper end portion of the shift lever 14.

At an upper end portion of the base plate 10 is independently provided a detent plate 16 in such a manner that the direction of thickness of the detent plate 16 is in alignment with the axial direction of the sleeve 12. The detent plate 16 is provided with a detent hole 18. The detent hole 18 is pierced by a detent pin 22 protruding from a long hole 20 provided in a shift lever 14.

The detent pin 22 is guided by the long hole 20 so as to be movable up and down in the axial direction of the shift lever 14, and is upwardly urged by an urging means (not shown) provided in the shift lever 14. This detent pin 22 is interconnected via a rod or the like (not shown) provided in the shift lever 14, with a detent cancellation button 24 provided on the shift knob 11, in such a way that pressing the detent cancellation button 24 enables the detent pin 22 move in the downwards direction against the urging force of the urging means (not shown).

The detent hole 18 has an inner wall on a topmost side undulating to correspond to the shift positions of "P", "R", "N", "D", "2" and "L". Therefore, the detent pin 22 is restricted to be moved in the direction indicated by the arrow A or B when the detent pin 22 opposes a projection of the undulation formed on the inside wall of the detent hole 18.

This is to say, when the surface of the projection that the detent pin 22 opposes is approximately parallel with the axis of the shift lever 14, it is impossible for the shift lever 14 to be moved in the direction of the arrow A or B unless the detent cancellation button 24 is pressed and the detent pin 22 is moved downwards. For example, unless the operation described above is performed when the shift lever 14 is at the "P" position, then it is not possible to shift the shift lever to another shift position.

The detent plate 16 is provided with a lock plate 26 on the surface of the side from which the detent pin 22 protrudes. The lock plate 26 is guided by a guide plate 28 fixed to the detent plate 16 so it can move upwards and downwards along the axial direction of the shift lever 14 positioned at the "P" shift position. At an upper end portion of the lock plate 26 is a cutout 30 opening in the direction of the "R" shift position indicated to the left in FIG. 1 and the cutout 30 is enlarged in a taper shape at its an entrance portion 30A. When the shift lever 14 is at the "P" shift position, the detent pin 22 can move deeper into the cutout 30 than the entrance portion 30A, and enter as far as inner portion 30B.

At a top end of the lock plate 26 is provided a stopper 32 protruding in the direction of the right-hand side of FIG. 1A, i.e., in the direction opposite the "R" shift position. This stopper 32 comes into contact with the top end of the guide plate 28 and restricts the lower limit of movement of the lock plate 26.

When the lock plate 26 is at the position of its lower limit of movement, the entrance portion 30A of the cutout 30 and the portion of the detent hole 18 positioned between the "P" shift position and the "R" shift position 30 overlap each other.

Figure 2:
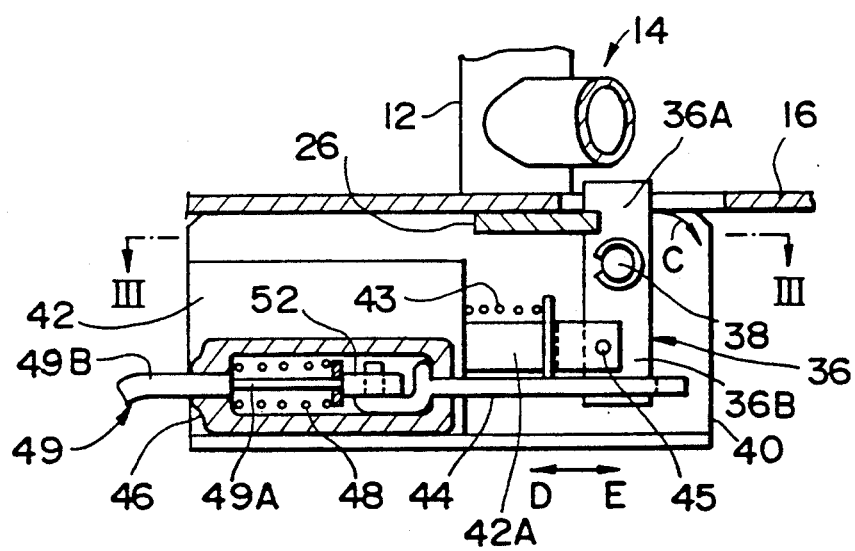
FIG. 2 is a sectional diagram along the section lines II—II of FIG. 1A.
Figure 3:
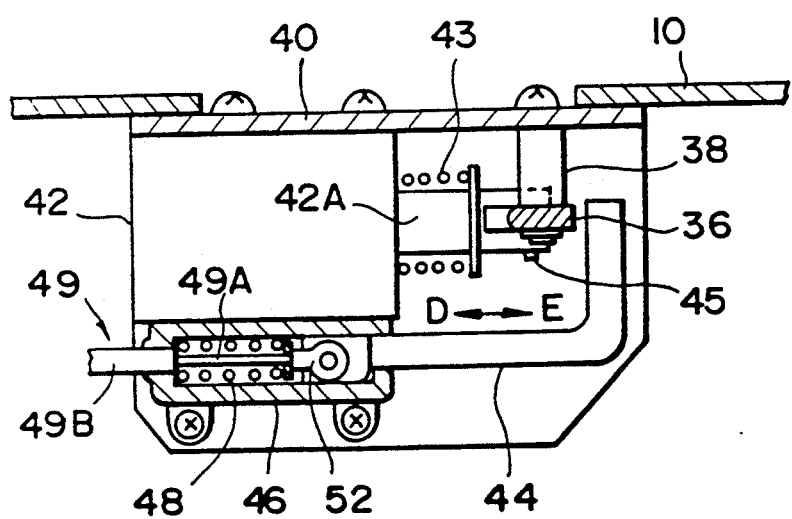
FIG. 3 is a sectional diagram along the section lines III—III of FIG. 2.

The lock plate 26 is also formed at its lower end with a lower cutaway 34 by cutting a corner positioned on the right-hand side of FIG. 1A, i.e., on the side opposite the "R" shift position. A first end part 36A of a lever plate 36 enters the lower cutaway 34 so that the lever plate 36 can engage the lock plate 26. The lever plate 36 is disposed with its length in the horizontal direction, and the middle part thereof is supported by a top end portion of a support pin 38 disposed with its axis in the vertical direction, as shown in FIG. 2 and (upside down) in FIG. 3. The support pin 38 is mounted to an L-shaped bracket 40, the bottom of which is mounted to the base plate 10.

A solenoid 42 serving as an actuator is mounted to the L-shaped bracket 40 and a plunger 42A is connected via a pin 45 to a second end portion 36B of the lever plate 36. The solenoid 42 is of the pull type, and the plunger 42A is pulled out by the urging force of a return spring 43 comprising a compression coil spring wound around the plunger 42A but, when the solenoid is excited the plunger 42A is pulled in against the urging force of the return spring 43 so that the lever plate 36 is swung in the direction of the arrow C shown in FIG. 2.

In the condition that the lever plate 36 is swung in the direction of the arrow C as described above, the first end part 36A is separated from the lock plate 26.

As described above, the lock plate 26, the lever plate 36, the solenoid 42 and the return spring 43 and the like constitute a shift lock mechanism, and the solenoid 42 is supplied with power to be excited by an electrical control device, when the ignition is on and the brake is operated in the condition that the "P" shift position is selected.

A forward end portion of a hook-shaped release bar 44 disposed in parallel with the plunger 42A can engage with the second end portion 36B of the lever plate 36. The rear end portion of the release bar 44 is inserted into a cylinder 46 and is guided by the inside wall of the cylinder 46 to be movable in the directions indicated by the arrows D and E in parallel with the axial direction of the solenoid 42. The cylinder 46 is mounted to an upright wall of the bracket 40 disposed upwards of the solenoid 42. The release bar 44 is urged in the direction of the arrow E of FIG. 2 by a return spring 48 constituted by a compression coil spring. Then, when the release bar 44 is moved against the urging force of the return spring 48 in the direction of the arrow D, the forward end portion of the release bar 44 begins to engage with the second end portion 36B of the lever plate 36 to cause the plunger 42A to be pulled in against the urging force of the return spring 43 and the lever plate 36 is swung in the direction indicated by the arrow C in FIG. 2.

As described above, the release bar 44, the cylinder 46 and the return spring 48 constitute an operating mechanism for a manual shift lock cancellation means.

The rear end portion of the release bar 44 described above is secured via a joint 52 inside the cylinder 46, to an inner cable 49A of a pull cable 49 which is a driving force transmission cable. An outer cable 49B of the pull cable 49 is secured to the cylinder 46 so that the release bar 44 is moved in the direction indicated by the arrow D when the inner cable 49A is pulled.

Figure 4:
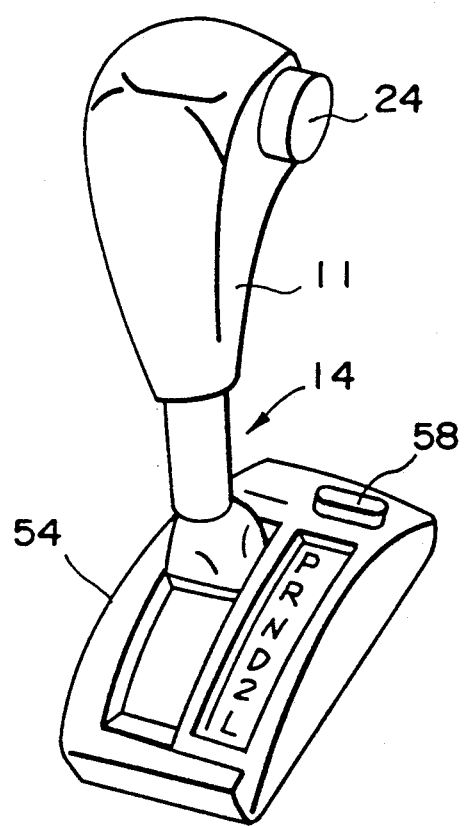
FIG. 4 is a perspective view of a shift lever apparatus for an automatic transmission according to the first embodiment of the present invention.
Figure 5:
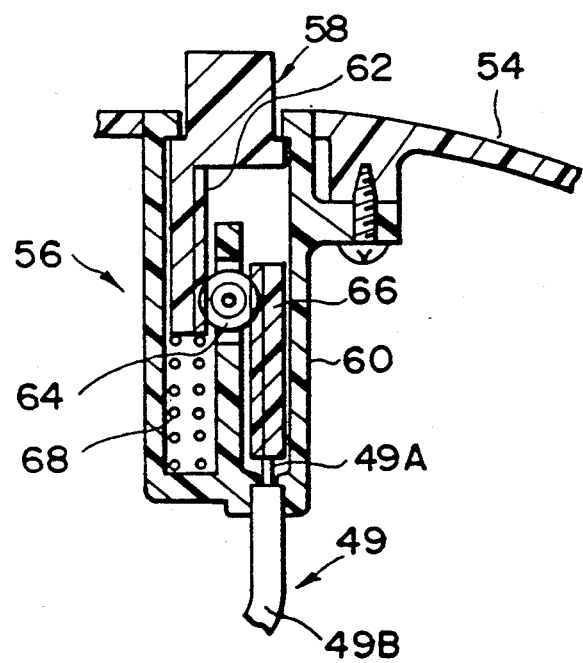
FIG. 5 is a sectional diagram of the operating portion of a shift lever apparatus for an automatic transmission according to the first embodiment of the present invention.

A cover 54 indicated in FIG. 4 is disposed so as to cover the base plate 10 upon which the members described above are assembled. As is shown in FIG. 5, the operating portion 56 for the manual shift lock cancellation means is assembled to the cover 54. The operating portion 56 has a shift lock cancellation push button 58, an upper end thereof protruding out of the housing and a lower end thereof being housed in a box 60 mounted to the cover 54 and the shift lock cancellation press button 58 being guided by the inner wall of the box 60 to be movable upwards and downwards.

A rack 62 is formed at the lower portion of the shift lock cancellation push button 58 and this rack 62 engages with a pinion 64 axially supported by the box 60. Moreover, this pinion 64 engages with a rack 66 that is housed in the box 60 and is guided by the inner wall of the box 60 so as to be movable upwards and downwards in parallel with the rack 62.

The shift lock cancellation push button 58 is urged in the upwards direction by a return spring 68 constituted by a compression coil spring housed in the box 60. Moreover, a lower end portion of the rack 66 is secured to the other end of the inner cable 49A of the pull cable 49, and the other end of the outer cable 49B is secured to a lower end of the box 60.

Thus, when the shift lock cancellation push button 58 is pressed to be moved downwards against the urging force of the return spring 68, the pinion 64 which engages with the rack 62 is rotated in the counterclockwise direction in FIG. 5, and the rack 66 in engagement with the pinion 64 is moved in the upwards direction so as to pull the inner cable 49A upwards. Furthermore, the distance that the rack 66 moves upwards is the same as the distance that the rack 62 moves downwards, and so the distance it moves is the same as distance that the shift lock cancellation push button 58 moves in the downwards direction.

In the shift lever apparatus of this embodiment configured as described above an arm (not shown) fixed to the sleeve 12 is connected via cables, links or the like to a valve provided in a hydraulic control device of an automatic transmission so that the hydraulic range selected by the valve corresponds to the shift position of the shift lever 14.

The following is a description of the operation of this embodiment of the present invention.

The shift operation is conducted by holding the shift knob 11 and swinging the shift lever 14 in the direction indicated by the arrow A or B shown in FIG. 1A. In accordance with the relationship of the shift positions before shift and after shift the shift operation is performed in the condition that detent cancellation button 24 is pressed so that the detent pin 22 has been moved downwards or it is performed without pressing the detent cancellation button 24. This is the same operation as for known shift lever apparatus.

When a vehicle is in a parked state, the shift lever 14 has the "P" shift position selected and the status of the shift lever apparatus is as shown in FIG. 1A. This is to say that the detent pin 22 is in the recess of the detent hole 18 corresponding to the "P" shift position and that it is positioned in the inner portion 30B of the cutout 30 formed in the lock plate 26 and is in contact with the upper inner wall of the inner portion 30B. The lock plate 26 attempts to move downwards due to its own weight but this is prevented by the urging force of an urging means (not shown) that urges the detent pin 22 in the upwards direction so that the detent pin 22 is maintained in a held state.

Also, the first end part 36A of the lever plate 36 enters the lower cutaway 34 formed at the bottom end of the lock plate 26.

Thus, for the shift operation 1 in this status, pressing the detent cancellation button 24 allows the detent pin 22 to move downwards until the detent pin 22 comes into contact with the lower inner wall of the inner portion 30B of the cutout 30. However, the lock plate 26 is prevented from moving downwards by the lever plate 36 and so further movement is not possible.

Even in this status, the detent pin 22 is located with the closed space formed by the overlap of the cutout 30 and the detent hole 18 in the same manner as before the detent cancellation button 24 is pressed and so the shift lever 14 cannot be swung and the shift operation is consequently not possible.

The ignition is switched on when a parked vehicle is to be moved and attempting to perform the shift operation without performing brake operation will again cause the same status as described above for the shift lever apparatus and shift operation will not be possible.

Performing brake operation will fulfill the conditions for the excitation of the solenoid 42 and the solenoid 42 will have electricity supplied by the electrical control device and will be excited. Excitation of the solenoid 42 will cause the plunger 42A to overcome the urging force of the return spring 43 and be pulled in. This swings the lever plate 36 in the direction of the arrow C indicated in FIG. 2 and the first end part 36A will separate from the lower cutaway 34 and disengage from the lock plate 26.

Then, pressing the detent cancellation button 24 will move the lock plate 26 in the downwards direction together with the detent pin 22 while the lock plate 26 is still supported by the detent pin 22. When the detent pin 22 moves downwards to a certain extent, it can be released from the recess formed in the detent hole 18 in the left-hand direction in FIG. 1 and the shift lever 14 can be swung in the direction indicated by the arrow B in FIG. 1A.

After the detent pin 22 has been released from the cutout 30, the stopper 32 comes into contact with the upper end of the guide plate 28 and the lock plate 26 is held in that status.

When the shift lever 14 is moved from the "P" shift position, the solenoid 42 is deenergized and the plunger 42A is urged by the return spring 43 and is pulled out to swing the lever plate 36 in the direction indicated by the arrow C in FIG. 2.

As the lock plate 26 is now at a position lower than the position indicated in FIG. 1A, the first end part 36A of the lever plate 36 is in contact with the upper portion of the lower cutaway 34 and it is prevented from being swung. When in this status, the lever plate 36 is pressed by the urging force of the return spring 43 and is in contact with the lock plate 26 so that the lock plate 26 is not moved due to vibration or other movement of the vehicle.

When the shift lever 14 is shifted from positions other than the "P" shift position to the "P" shift position, the shift lever 14 is swung in the direction indicated by the arrow A in FIG. 1A while the detent cancellation button 24 is pressed down, and the detent pin 22 enters the cutout 30 of the lock plate 26.

Moreover, when the detent pin 22 strikes either the upper or lower walls of the entrance portion 30A of the cutout 30, the entry of the detent pin 22 into the inner portion 30B is smooth because the surfaces along which the detent pin 22 moves are angled.

When the detent pin 22 has entered the inner portion 30B of the cutout 30, releasing the detent cancellation button 24 will cause the detent pin 22 to be urged upwards by an urging means (not shown) and the lock plate 26 will be raised and move upwards together with the detent pin 22.

When operation to shift the shift lever 14 to the "P" shift position is performed in this manner, normal driving operation involves brake operation and so the solenoid 42 is excited at the same time as the shift lever 14 is moved to the "P" shift position, and the lever plate 36 is swung in the direction indicated by the arrow C in FIG. 2 so that the first end part 36A moves away from the lock plate 26. Accordingly, when the lock plate 26 moves upwards, the lever plate 36 is not being pressed by the lock plate 26 and so the lock plate 26 can move smoothly upwards together with the detent pin 22.

The solenoid is deenergized when the detent cancellation button 24 is no longer being pressed and when the brake operation is stopped. With this, the plunger 42A is urged by the return spring 43 and is pulled out of the solenoid 42 and the lever plate 36 is swung in the direction reverse to the direction indicated by the arrow C in FIG. 2.

When this occurs, the lock plate 26 rises to the position indicated in FIG. 1A and so the first end part 36A of the lever plate 36 enters the lower cutaway 34 of the lock plate 26. This status is the situation shown in FIG. 1A.

The shift lock cancellation press button 58 is pressed when the shift lever 14 is shifted to another shift position in the condition that the solenoid 42 cannot be excited for some reason while the shift lever 14 is in the "P" shift position. Pressing the shift lock cancellation push button 58 pulls the inner cable 49A of the pull cable 49 as has already been described.

Through this, the inner cable 49A causes the release bar 44 to move in the direction indicated by the arrow D in FIG. 2 against the urging force of the return spring 48. The end portion of the release bar 44 engages with the second end portion 36B of the lever plate 36 to swing the lever plate 36 in the direction indicated by the arrow C in FIG. 2 while the plunger 42A is caused to be pulled in against the urging force of the return spring 43. When this occurs, the first end part 36A of the lever plate 36 is disengaged from the lower cutaway 34 of the lock plate 26.

This status is in the same status as the excited status of the solenoid 42 and so press in the detent cancellation button 24 and moving the shift lever 14, as has been described before, will enable the shift lever 14 to be moved to another position.

After the shift lever 14 has been moved from the "P" shift position to another shift position, stopping pressing the shift lock cancellation press button 58 will cause the release bar 44 to be urged by the return spring 48 and move in the direction indicated by the arrow E in FIG. 2. At the same time, the shift lock cancellation press button 58 will be urged by the return spring 68 and move in the upwards direction so that the plunger 42A is urged by the return spring 43 to be pulled out and the lever plate 36 swings in the direction opposite the direction indicated by the arrow C in FIG. 2 and the upper edge of the lower cutaway 34 comes into contact with the lockplate 26.

Also, when the shift lever 14 is moved to the "P" shift position and the detent pin 22 is moved in the upwards direction in the status where the solenoid 42 cannot be excited, then the lever plate 36 presses into contact with the lock plate 26 and therefore rubs against the lock plate 26 so that when the detent pin 22 reaches practically the upper limit of its movement, the lever plate 36 is swung by urging force of the return spring 43 so that the first end part 36A enters the lower cutaway 34.

In the shift lever apparatus of this embodiment constituted and operated above, the manual shift lock cancellation means is provided with the motive mechanism mounted on the base plate 10 and the operating portion mounted on the cover 54 which are connected to each other via a pull cable 49 that serves as the driving force transmission cable. Therefore, with respect to the manual shift lock cancellation means, absolutely no adjustment is necessary for the position of the cover 54 to the base plate 10.

Because of this, the work of assembling the unit comprising the base plate 10 and the cover 54 is facilitated and the work process is not hampered by the manual shift lock cancellation means.

Furthermore, the pull cable 49 is flexible and can be freely twisted so that unlike in conventional configurations, it is not necessary to dispose rods or the like in the space between the base plate and the cover in order to align the ends of the operating portion and the ends of the motive mechanism. This not only permits the degree of design freedom to be greatly increased, but also allows the shift lever apparatus to be made more compact.

Still furthermore, the operating portion 56 of the cover 54 can be freely disposed and positioned irrespective of the disposition and position of the motive mechanism and so it is possible to use a shift lever of the same structure for vehicles of different type, and it is also possible to easily mount the operating portion 56 not only in the cover but also in a console or an instrument panel or the like.

Figure 6:
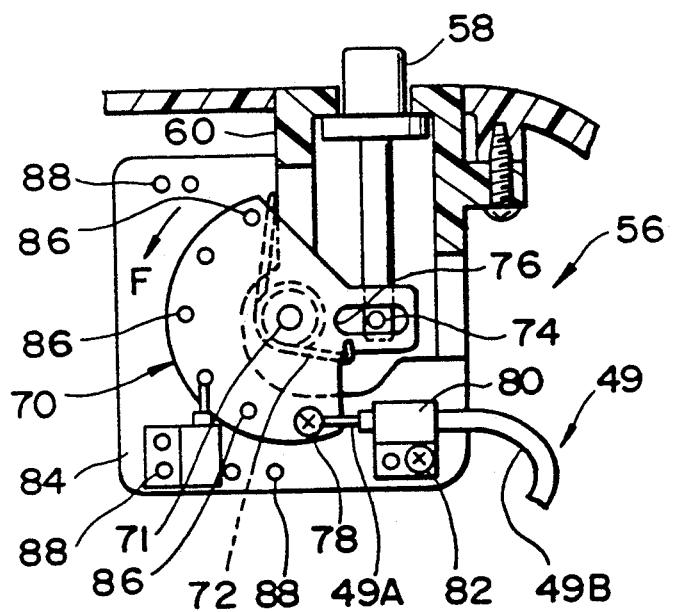
FIG. 6 is a sectional diagram of another embodiment of the operating portion of a shift lever apparatus for an automatic transmission.
Figure 7:
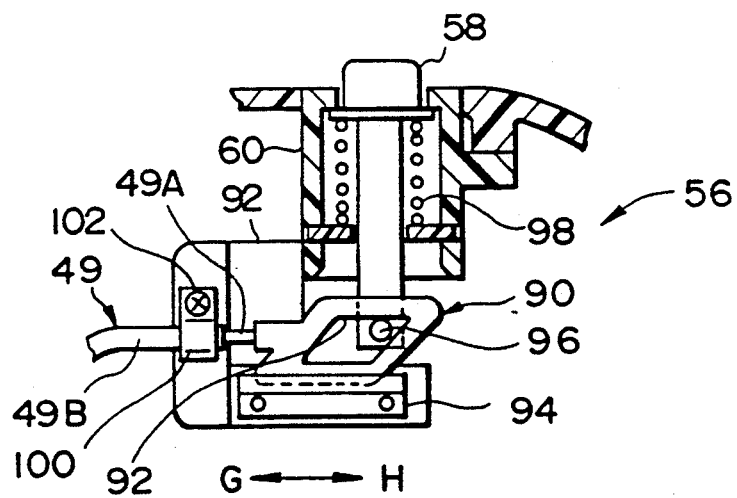
FIG. 7 is a sectional diagram of another embodiment of the operating portion of a shift lever apparatus for an automatic transmission.
Figure 8:
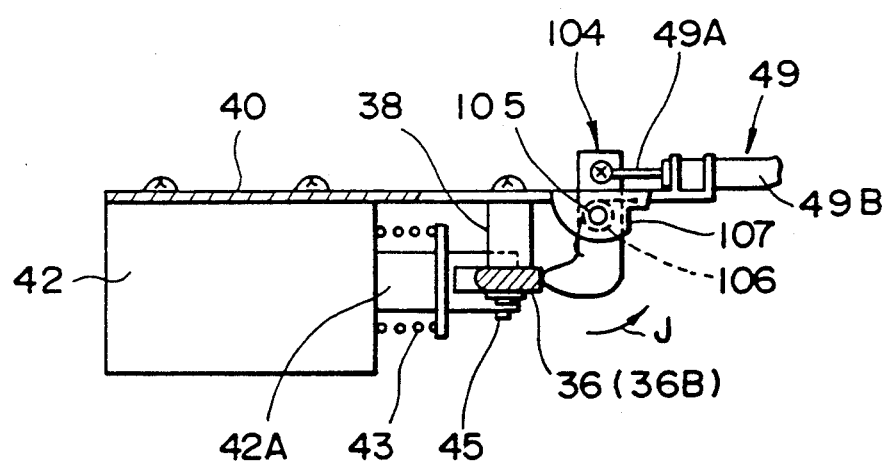
FIG. 8 is a sectional diagram of another embodiment of the motive mechanism of a shift lever apparatus for an automatic transmission.

FIG. 6 through 8 are diagrammatic illustrations of other embodiments of the operating portion and the motive mechanism.

FIG. 6 illustrates another embodiment of the operating portion 56, in which there is a rotating plate 70 between the shift lock cancellation press button 58 and the pull cable 49.

This is to say that the rotating plate 70 is axially supported by the box 60 via a pin 71 so as to be rotatable and is urged in the direction indicated by the arrow F by a torsion coil spring 72. A pin 74 is protrudingly provided at a lower end of the shift lock cancellation press button 58 and is inserted into a long hole 76 provided in the rotating plate 70. A screw 78 secures the inner cable 49A of the pull cable 49 to the rotating plate 70 and the outer cable 49B is clamped in a clamp 80 and a screw 82 secures it to a plate 84 which is part of the box 60.

In this arrangement, pressing the shift lock cancellation press button 58 causes the rotating plate 70 to overcome the urging force of the screw coil spring 72 and rotate in the direction indicated by the arrow F, so that the inner cable 49A is pulled.

In this embodiment, there are multiple holes 86 provided around the rotating plate 70 for the screw 78 to be positioned, thereby enabling the securing position of the pull cable 49 to be changed and therefore allow multiple variations for the direction in which the pull cable 49 is pulled. Use of this apparatus on different models of vehicles is therefore facilitated. Furthermore, multiple mounting holes 88 for the screw 82 are provided in the plate 84 so that the securing position of the clamp 80 can be changed in accordance with changes in the securing position of the inner cable 49A.

FIG. 7 illustrates still another embodiment of the operating portion 56, in which a slide plate 90 is disposed between the shift lock cancellation press button 58 and the pull cable 49.

This is to say that the slide plate 90 is guided by a plate 92 that is part of a box 60 and a guide plate 94 fixed to the plate 92, and is slidably movable in the direction indicated by the arrows G and H in FIG. 7. The slide plate 90 is provided with a parallelogrammic through hole 92a and this parallelogrammic through hole 92a is passed through by a pin 96 protrudingly provided at a lower end of the shift lock cancellation press button 58. The shift lock cancellation press button 58 is upwardly urged by a return spring 98 and the pull cable 49 has the inner cable 49A secured to the slide plate 90 and the outer cable 49B secured to the plate 92 via a clamp 100 and a screw 102.

In this arrangement, when the shift lock cancellation press button 58 is pressed against the urging force of the returning spring 98, the angled inner wall of the parallelogrammic through hole 92a is pressed by the pin 96 to move the slide plate 90 in the direction indicated by the arrow H, so that the inner cable 49A is pulled as a consequence.

FIG. 8 illustrates another embodiment of the motive mechanism which instead of the release bar 44 of the previously described first embodiment, has a release bar 104 of which the middle portion is supported via a pin 105 in a bottom wall of the bracket 40 (refer to the previously described first embodiment) so as to be swingably movable. A return coil spring 106 comprised of a torsion coil spring urges the release bar 104 in the direction indicated by the arrow J so that the release bar 104 is in contact with a stopper 107. One end portion of the release bar 104 opposes a second end portion 36B of the lever plate 36 and the other end thereof is secured to the inner cable 49A of the pull cable 49. The other cable 49B is secured to the bracket 40.

With this configuration, when the inner cable 49A is pulled, the release lever 104 is swung against the urging force of the return coil spring 106 in the direction opposite the direction indicated by the arrow J, so that the lever plate 36 is swung to be separated from the lock plate 26 (refer to the previously described first embodiment).

The first embodiment and the other embodiments for the operating portion and the motive portion described above can be freely combined and used in various differing assemblies.

What is claimed is:

1. A shift lever apparatus for operating an automatic transmission of a vehicle, comprising:
   lock means for locking a shift lever against movement from a specific shift position to another shift position;
   lock cancellation means mounted in the vehicle at a position different from that of said lock means, to cancel the lock of the shift lever by manual operation by a driver and enable the shift lever to be moved to another shift position; and
   flexible transmission means connecting said lock cancellation means and said lock means to transmit an operating force of said lock cancellation means to said lock means as one of a tensile force and a compressive force, whereby the operating force of said lock cancellation means can be definitely transmitted to said lock means even if said lock means and said lock cancellation means are mounted in different positions in the vehicle.

2. A shift lever apparatus according to claim 1, wherein said flexible transmission means comprises an inner cable slidable in a cable cover in the direction of the length of said inner cable, said inner cable transmitting the one of the tensile and the compressive force.

3. A shift lever apparatus according to claim 1, wherein an end of said flexible transmission means is supported on a base plate axially supporting said shift lever, and the other end thereof is mounted to a cover mounted to said base plate to cover said lock means of said shift lever.

4. A shift lever apparatus according to claim 1, wherein the operating force of the driver is reversed and transmitted to said lock cancellation means as the tensile force.

5. A shift lever apparatus according to claim 2, further comprising an adjustment means to change the mounting position between said end of said inner cable and a member to which the driver applies the operating force.

6. A shift lever apparatus according to claim 3, wherein said lock cancellation means is provided with a pushbutton to transmit a lock cancellation force by a pushing operation of said pushbutton toward the inside of said cover.

7. A shift lever apparatus according to claim 1, wherein said lock means is provided with a lock plate mounted on said shift lever to lock a movement of a detent pin movable in the axial direction of said shift lever, and a lever plate to lock movement of said lock plate in the axial direction of said shift lever, and wherein said lock cancellation means uses a cable tensile force to separate said lever plate from said lock plate.

8. A shift lever apparatus according to claim 7, wherein said lock cancellation means has a release lever separately disposed from said lever plate, so that when there is driver operation, said release lever engages with said lever plate and forces said lever plate to separate from said lock plate.

9. A shift lever apparatus according to claim 8, wherein an end of said flexible transmission means is supported on a resin cover covering said detent pin, said lock plate, and said lever plate, and the other end of said flexible transmission means is supported on a base plate for supporting said shift lever.

10. A shift lever apparatus for operating an automatic transmission of a vehicle, comprising:
    a base plate fixed to a vehicle body,
    locking means locking a shift lever supported by said base plate at a specific shift position and enabling shift movement of said shift lever when a driver performs braking operation or other special operation, said locking means being supported by said base plate;
    a cover covering said locking means mounted to said base plate;
    lock cancellation means mounted to said cover, for forcedly cancelling the lock of said shift lever by operation of a driver; and
    a flexible transmission cable connecting said lock cancellation means and said lock means, for transmitting a driver operation force in an axial direction thereof to cancel the lock of said shift lever.

11. A shift lever apparatus according to 10, wherein said flexible transmission cable comprises an inner wire cable to transmit one of a compressive force and a tensile force, one end of a tube covering said inner wire cable being mounted to said base plate, and the other end thereof being mounted to said cover.

12. A shift lever apparatus according to claim 10, wherein said lock cancellation means is provided with a button pushed toward the inside of said cover by a pushing in operation of the driver.

13. A shift lever apparatus according to claim 10, wherein said lock cancellation means is provided with a reversing means to reverse the pressing-in operating force of the driver and transmit it as a cable tensile force.

14. A shift lever apparatus according to claim 12, wherein a mounting position between said button and said flexible transmission cable is changeable.

15. A shift lever apparatus according to claim 12, wherein said cover to which said button is mounted, covers said a base plate.

16. A shift lever apparatus for shifting an automatic transmission of a vehicle, comprising:
    a base plate fixed to a vehicle body;
    a detent plate protruded from said base plate;
    a detent means provided on said detent plate and protruding from a shift lever axially supported on said base plate, for operating in conjunction with a detent pin movable in a direction of an axis of said shift lever, in order to lock said shift lever against movement from a parking shift position to another shift position;

a lock plate to engage said detent pin and lock said shift lever against movement from the parking shift position to another position;

a lever plate to engage said lock plate and place said lock plate in a fixed status;

release means mounted to said base plate to correspond to said lever plate;

a cover mounted to said base plate to cover said lock plate;

a pushbutton for driver operation, provided on said cover; and a flexible wire for transmitting an operative force of said push button to said release means, and to forcedly separate said lever plate from said lock plate and enable shift operation of said shift lever.

17. A shift lever apparatus according to claim 16, wherein one end of a case housing said flexible wire is mounted to said base plate, and the other end thereof is mounted to said cover.

18. A shift lever apparatus according to claim 16, wherein said pushbutton is pushed toward the inside of said cover by driver operation.

19. A shift lever apparatus according to claim 16, wherein a pushing-in force of said pushbutton is reversed and transmitted to said lever plate as a tensile force of a wire.

* * * * *